United States Patent
Kruger et al.

(10) Patent No.: US 9,653,748 B2
(45) Date of Patent: May 16, 2017

(54) APPARATUS AND METHOD FOR SECURING BATTERY CELL PACKS

(75) Inventors: Duane D. Kruger, Fishers, IN (US);
Robert C. Beer, Noblesville, IN (US);
Brad Hanauer, Muncie, IN (US);
Robert T. Wendling, Pendleton, IN (US)

(73) Assignee: ENERDEL, INC., Indianapolis, IN (US)

( * ) Notice: Subject to any disclaimer, the term of this patent is extended or adjusted under 35 U.S.C. 154(b) by 931 days.

(21) Appl. No.: 11/106,176

(22) Filed: Apr. 14, 2005

(65) Prior Publication Data

US 2006/0234119 A1    Oct. 19, 2006

(51) Int. Cl.
*H01M 10/04*    (2006.01)
*H01M 2/10*     (2006.01)
*H01M 2/20*     (2006.01)
*H01M 2/02*     (2006.01)
*H01M 10/052*   (2010.01)

(52) U.S. Cl.
CPC ......... *H01M 10/04* (2013.01); *H01M 2/1061* (2013.01); *H01M 2/202* (2013.01); *H01M 10/0486* (2013.01); *H01M 2/0207* (2013.01); *H01M 2/0287* (2013.01); *H01M 10/052* (2013.01); *Y10T 29/49108* (2015.01)

(58) Field of Classification Search
CPC ............. H01M 2/107; H01M 10/0413; H01M 10/0418; H01M 10/0486
USPC .................................... 429/99; 320/112, 107
See application file for complete search history.

(56) References Cited

U.S. PATENT DOCUMENTS

| 4,020,244 A | * | 4/1977 | Selinko .......................... 429/100 |
| 4,579,792 A |   | 4/1986 | Bruder |
| 4,927,717 A |   | 5/1990 | Turley et al. |
| 5,256,502 A | * | 10/1993 | Kump ............................ 429/150 |
| 5,393,617 A | * | 2/1995 | Klein ................................. 429/59 |
| 5,518,836 A |   | 5/1996 | McCullough |

(Continued)

FOREIGN PATENT DOCUMENTS

| DE | 696 13 076 | 3/2002 |
| EP | 1 505 670 | 2/2005 |

(Continued)

OTHER PUBLICATIONS

Machine translation for Tsuchiya et al., JP 2002-042753 A.*

(Continued)

*Primary Examiner* — Maria J Laios
(74) *Attorney, Agent, or Firm* — Faegre Baker Daniels LLP

(57) ABSTRACT

A framed lithium battery cell group includes a first frame member (20) and a second frame member (30). The frame members are locked together, clamping the lithium battery cell pack (10) on the seal edge surfaces (13, 16), thereby providing structural rigidity and protection from damage due to handling and vibration. Each of the frame members (20, 30) has multiple pins (25) and sockets (26) on the side opposite the clamping surface (33) to facilitate aligning and stacking multiple lithium battery cell pack and frame assemblies to form a lithium battery cell group (50). Each of the frame members (20, 30) include a buss bar capture feature (22, 32) having a bus bar (40) inserted therein for electrically connecting all of the terminals for a given lithium battery pack group to the buss bar (40).

8 Claims, 9 Drawing Sheets

(56) References Cited

U.S. PATENT DOCUMENTS

| | | | |
|---|---|---|---|
| 5,567,544 A | 10/1996 | Lyman | |
| 5,773,959 A | 6/1998 | Merritt et al. | |
| 5,800,942 A | 9/1998 | Hamada et al. | |
| 5,849,434 A | 12/1998 | Miura et al. | |
| 5,853,914 A | 12/1998 | Kawakami | |
| 5,874,185 A | 2/1999 | Wang et al. | |
| 5,900,183 A | 5/1999 | Kronfli et al. | |
| 5,952,126 A | 9/1999 | Lee et al. | |
| 5,961,672 A | 10/1999 | Skotheim et al. | |
| 6,340,877 B1* | 1/2002 | Mita et al. | 320/112 |
| 7,320,846 B2 | 1/2008 | Watanabe et al. | |
| 2002/0155348 A1* | 10/2002 | Gitto | 429/163 |
| 2003/0031920 A1* | 2/2003 | Hoffman et al. | 429/66 |
| 2004/0016455 A1* | 1/2004 | Oogami | 136/244 |
| 2004/0021442 A1* | 2/2004 | Higashino | 320/112 |
| 2004/0050414 A1 | 3/2004 | Oogami | |
| 2004/0058233 A1* | 3/2004 | Hamada et al. | 429/159 |
| 2005/0031946 A1* | 2/2005 | Kruger et al. | 429/159 |
| 2005/0100783 A1* | 5/2005 | Ro | H01M 2/1061 429/159 |
| 2005/0123828 A1* | 6/2005 | Oogami et al. | 429/152 |
| 2005/0208375 A1* | 9/2005 | Sakurai | 429/162 |

FOREIGN PATENT DOCUMENTS

| | | | | |
|---|---|---|---|---|
| JP | 09-120809 | | 5/1997 | |
| JP | 10003899 A | * | 1/1998 | |
| JP | 2000-092624 | | 3/2000 | |
| JP | 2001-511586 | | 8/2001 | |
| JP | 2002042753 A | * | 2/2002 | H01M 2/10 |
| JP | 2002-319383 | | 10/2002 | |
| JP | 2004-055449 | | 2/2004 | |
| JP | 2005-005163 | | 1/2005 | |
| WO | WO 99/05731 | | 2/1999 | |

OTHER PUBLICATIONS

Machine translation for Kazumoto et al., JP 10-003899 A.*
Linden, D., ed. Handbook of Batteries, 2nd Edition, Chapter 36, "Rechargeable Lithium Batteries (Ambient Temperature)" (author: Sohrab Hossain); U.S.: McGraw-Hill, Inc., 1995.
Linden, D., ed. Handbook of Batteries, 2nd Edition, Chapter 39, "Lithium/Iron Sufide Batteries" (author: Gary L. Henriksen); U.S.: McGraw-Hill, Inc., 1995.
English Translation of JP 2000-92624 A, Mar. 31, 2000, Nissan Motor Co. Ltd., 9 pgs.
English Translation of JP 2002-319383 A, Oct. 31, 2002, Toyota Motor Corp., 6 pgs.
English Translation of JP 2004-55449, Feb. 19, 2004, Nissan Motor Co. Ltd., 12 pgs.
Notification of Reasons for Rejection dated May 8, 2012.
Translation of German Office Action dated May 14, 2014 in corresponding German Application No. 11 2006 000 909.5.
International Search Report for PCT Application No. PCT/US2006/014221, dated Aug. 31, 2007 (3 pages).
International Preliminary Report on Patentability and Written Opinion for PCT Application No. PCT/US2006/014221, dated Aug. 31, 2007 (5 pages).

* cited by examiner

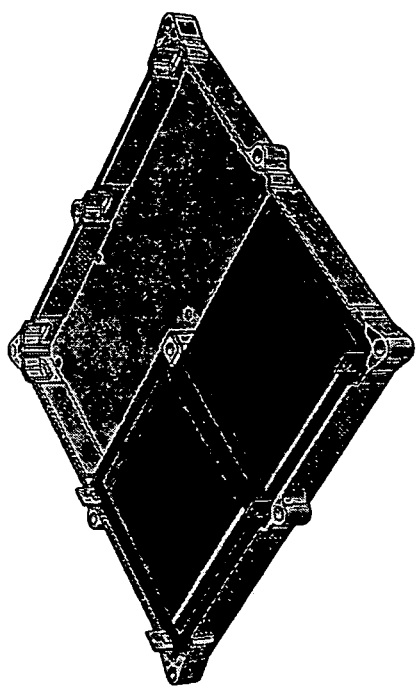
Fig. 7(a)
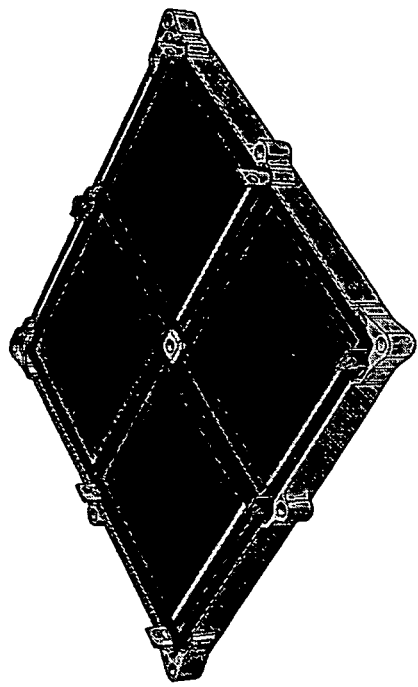
Fig. 7(b)
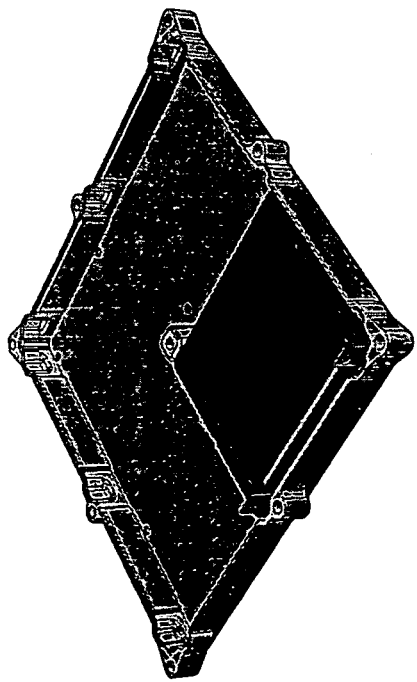
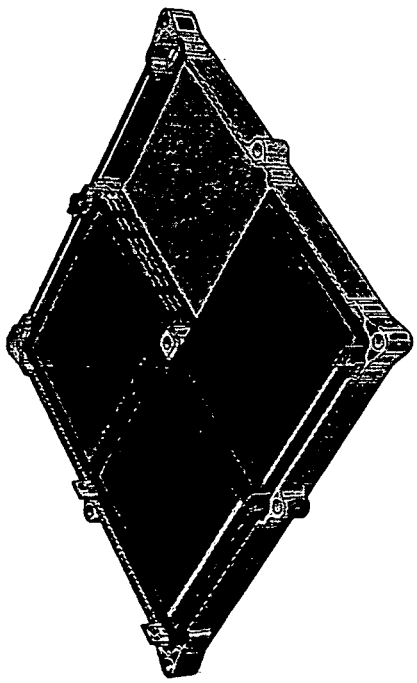

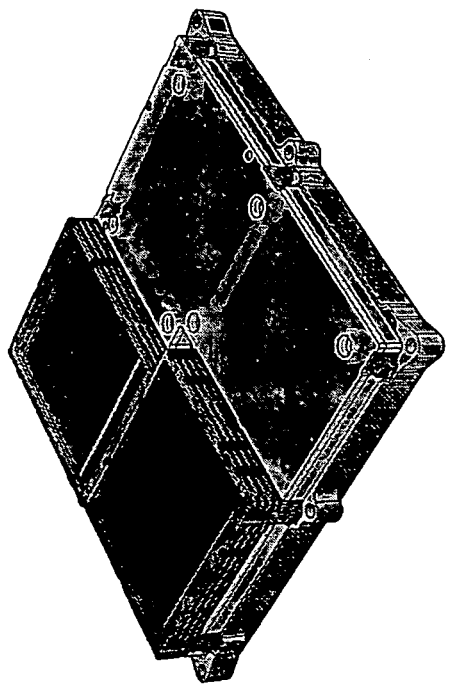
Fig. 7(c)
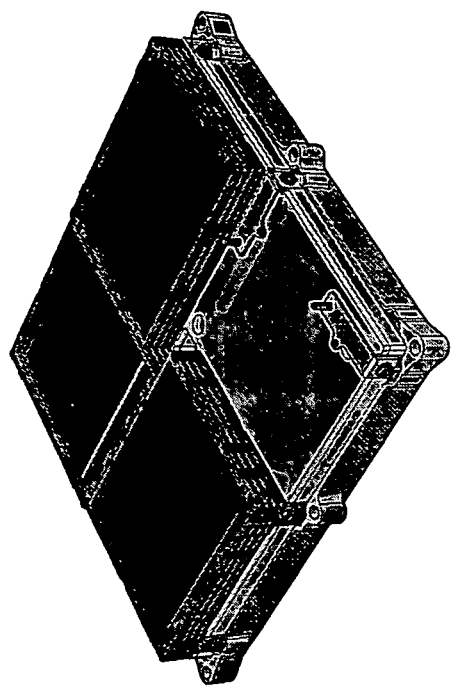
Fig. 7(d)
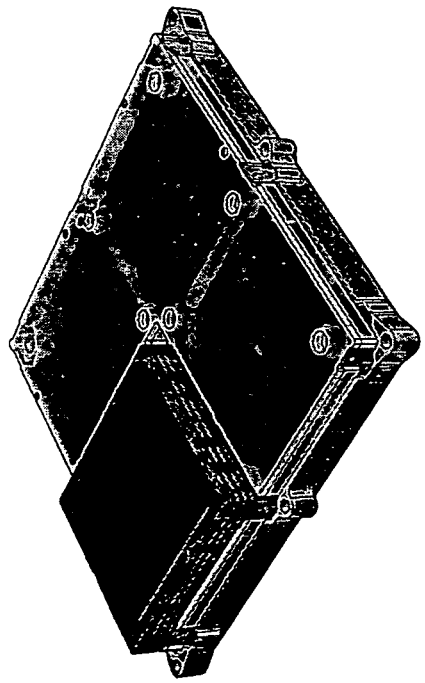
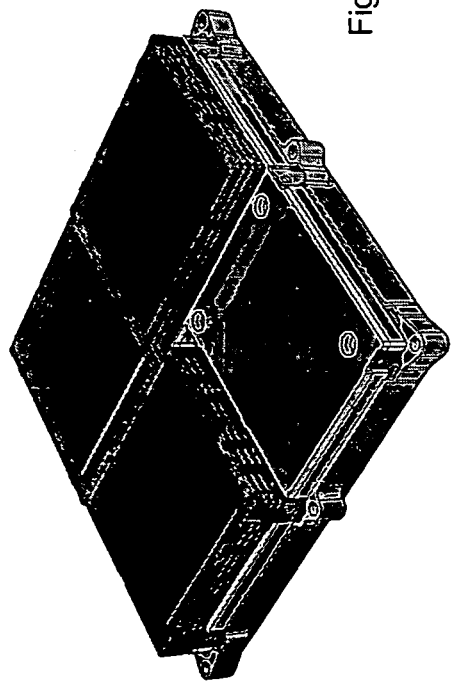

APPARATUS AND METHOD FOR SECURING BATTERY CELL PACKS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to battery group assembly.

BACKGROUND OF THE INVENTION

Packaging lithium battery cells in a metallic case is known in the art as can be seen in U.S. Pat. No. 6,406,815. These metallic cases have the advantage of protecting the cells from handling and vibration damage. They are also dimensionally consistent, allowing for combining of multiple cases into a single large pack as disclosed in U.S. Pat. No. 6,368,743.

However, the metallic cases are expensive to manufacture and each different configuration requires new dies to produce the various components and new tools to assemble those components. Consequently, techniques and materials for enclosing lithium battery cells in envelopes creating lithium battery cell packs have been developed, one type of which can be seen in U.S. Pat. No. 6,729,908. Unfortunately, these packages do not provide structural rigidity or protection from handling and vibration nearly as well as the metallic cases, nor can they be combined into consistently sized groups of cells because of the inherent variation in the thickness of a lithium battery cell pack.

SUMMARY OF THE INVENTION

A cell frame clamps the packaging envelope of a lithium battery cell pack around the perimeter from opposing sides, creating a lithium battery pack and frame assembly. If the packaging envelope is of the folded type, the frame can clamp on the three seal edges of the packaging envelope and provide a concave feature on the fourth or bottom edge to cradle and protect the packaging envelope bottom edge. If the packaging envelope is manufactured from two separate pieces and therefore sealed on all four sides, the cell frame may be designed to clamp on all four seal edges. The frame members have a buss bar capture feature which holds a buss bar securely in place to facilitate mechanically and electrically connecting all of the terminals for a given lithium battery pack group to the buss bar.

In another aspect of the present invention, the two frame members may be identical, thereby being manufacturable from a single mold cavity.

In another aspect of the present invention the frame members have a pin and socket configuration on the side facing away from the clamping surfaces in order to mate and align with one or more additional lithium battery cell pack and frame assemblies to create a lithium battery pack group.

In another inventive aspect, a housing is provided which encloses at least one cell group. The housing providing additional compressive force to the cell group. In one embodiment, the housing comprises a top and a bottom section, which are fastened together with fasteners. In an alternate embodiment, a pair of compression plates sandwich the cell group, the compression plates being fastened together to provide additional compressive force to the cell group. In yet another embodiment, at least one compression strap is provided. The compression strap wraps around the cell group to apply compressive stress.

For purposes of simplicity, the term "cells" is used herein to mean unicells, bicells, or any other basic battery cell construction.

BRIEF DESCRIPTION OF THE DRAWINGS

The present invention will now be described, by way of example, with reference to the accompanying drawings, in which:

FIG. 5(a) shows an internal compression system which utilizes compression plates and compression bolts, while FIG. 5(b) shows an another internal compression system which utilizes compression straps which wrap around the cell group.

FIG. 7(a)-(d) shows steps in an exemplary assembly process showing insertion of a plurality of framed cells according to the invention into an external protective case.

DETAILED DESCRIPTION OF THE INVENTION

Figure 1:
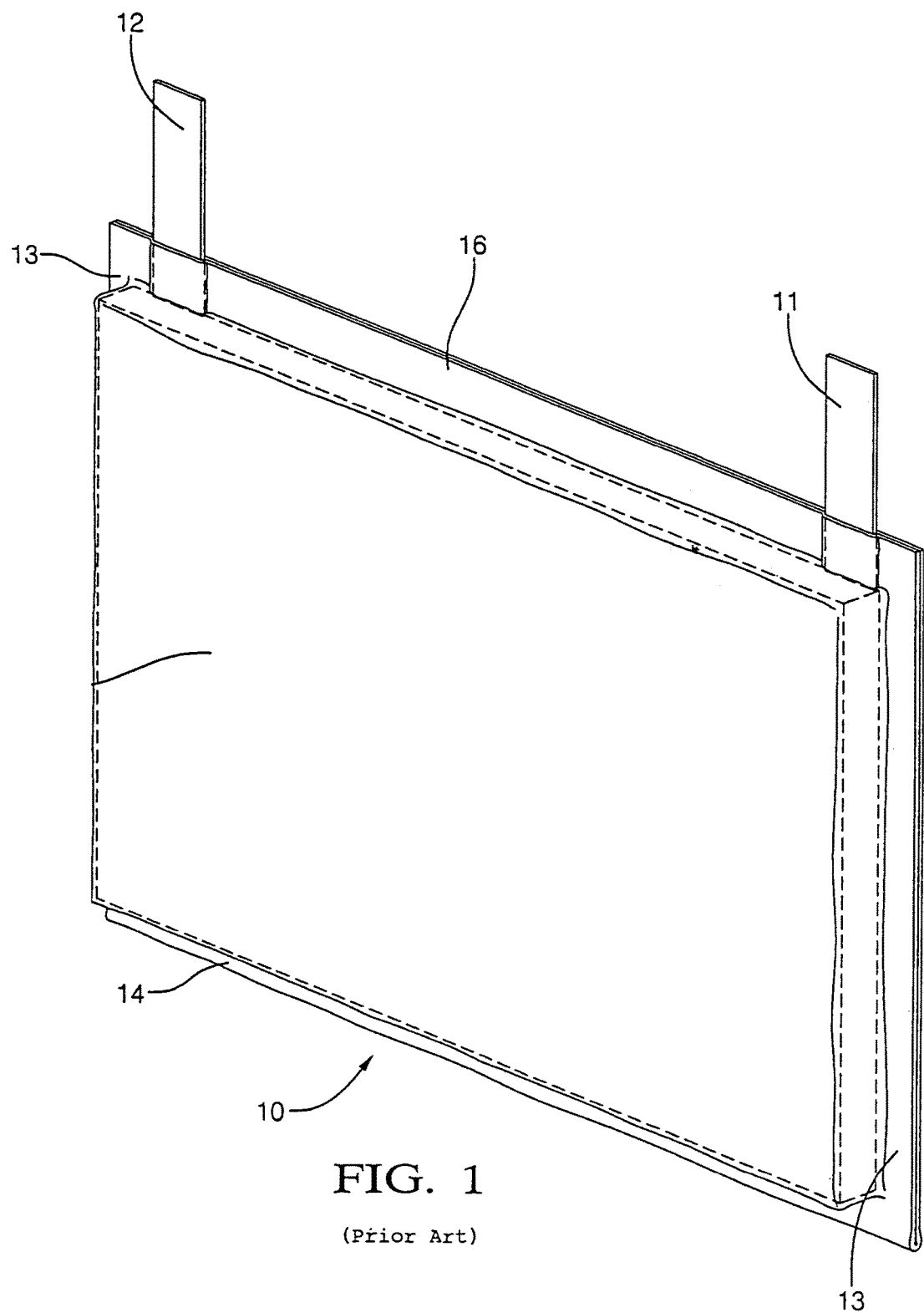
FIG. 1 illustrates an exemplary prior art lithium battery cell enclosed in a packaging envelope making a lithium battery cell pack.

Referring initially to FIG. 1, a typical lithium battery cell pack is shown and is generally designated 10. FIG. 1 shows that the lithium battery cell pack includes an anode terminal 11, a cathode terminal 12, a packaging envelope 15, side seal edges 13, top seal edge 16, and bottom edge 14. The actual anode and cathode assembly (battery cell) is shown in hidden lines, being hidden inside the packaging envelope 15.

In a preferred embodiment, packaging envelope 15 is made from a single piece of polymer coated aluminum foil and is folded around the lithium battery cell at the bottom edge 14 of the cell, and subsequently sealed to itself on side seal edges 13 and top seal edge 16. The packaging envelope could also be made from two or more separate pieces and subsequently sealed on all four edges.

Figure 2:
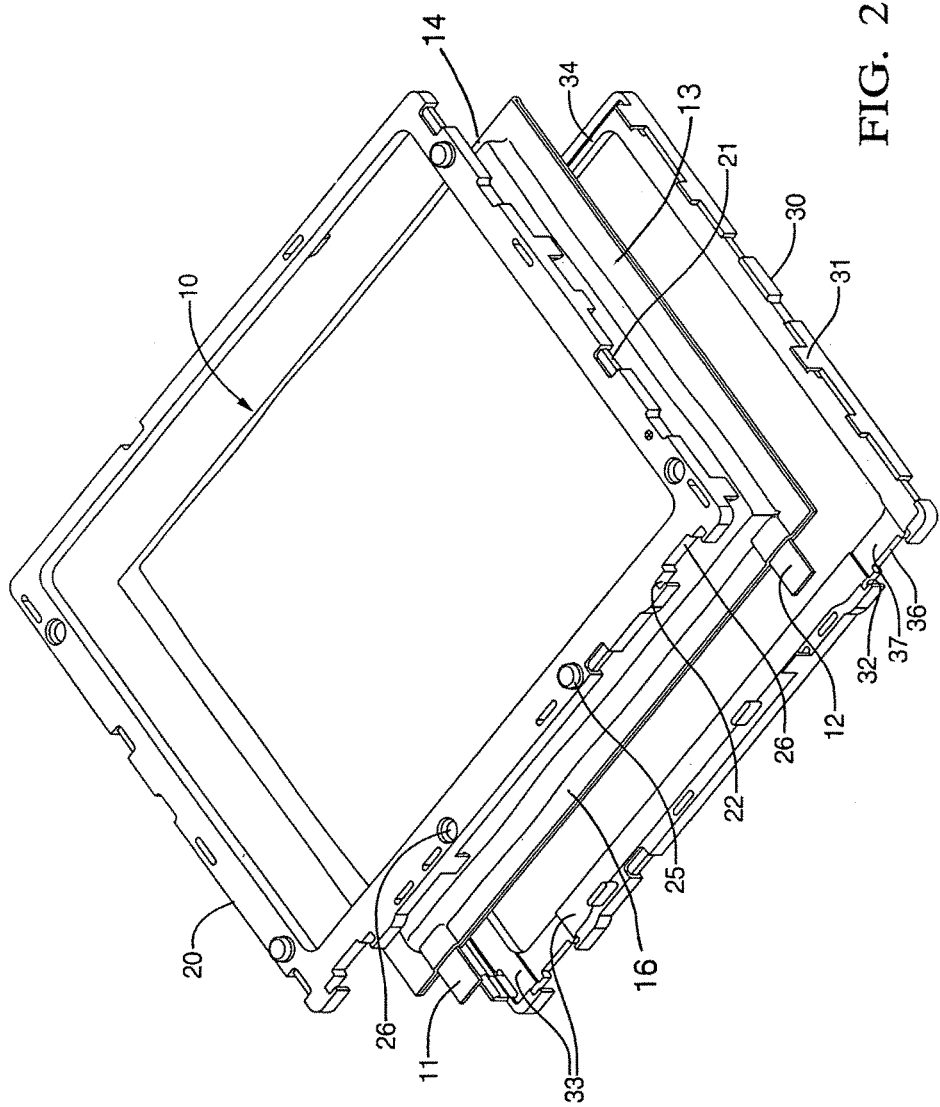
FIG. 2 illustrates two frame members in position before clamping on the seal edges of a lithium battery cell pack.

FIG. 2 shows first frame member 20 and second frame member 30 in position to be clamped on a lithium battery cell pack 10 shown disposed therebetween, according to an embodiment of the invention. Frame members 20 and 30 are preferably plastic frames, such as from readily moldable plastics. An exemplary readily moldable plastic that is relatively inexpensive and structurally sufficient is ABS plastic. If there is a requirement for a fire resistant plastic, a plastic having intumescent properties is preferably used, such as the elastomeric intumescent material disclosed in U.S. Pat. No. 6,809,129 to Abu-Isa.

As first frame member 20 and second frame member 30 are pressed together thereby clamping on side seal edges 13 and top seal edge 16 of lithium battery cell pack 10, snap tangs 31 engage with tang receivers 21 at multiple points around the periphery of the frame members 30 and 20, respectively, to lock the frame members together, thus securing lithium battery cell pack 10 in the frame assembly. Tangs 31, around the periphery, also serves as an a alignment features for the lithium cell as it is inserted into the cell frame. Both the first frame member 20 and the second frame member 30 include terminal clearance feature 37, allowing clearance on the clamp surface 33 at the portion of the frame where the terminals 11 and 12 protrude from the packaging envelope so the clamp surface 33 will not be clamped on the terminals. In a preferred embodiment, the bottom edge 14 of lithium battery cell pack 10 is held in position by a trough which is formed by the two concave surfaces 34 coming together when the two frame members are locked together. This trough helps to protect the bottom edge 14 of the lithium battery cell pack 10.

FIG. 2 also shows anode terminal 11 and cathode terminal 12 in the straight position as they would be after the two frame members 20 and 30 are locked together. FIG. 2 further shows buss bar capture feature 22 on the first frame member 20 and buss bar capture feature 32 on the second frame member 30. The function of these features will be described below relative to FIG. 3.

Figure 3:
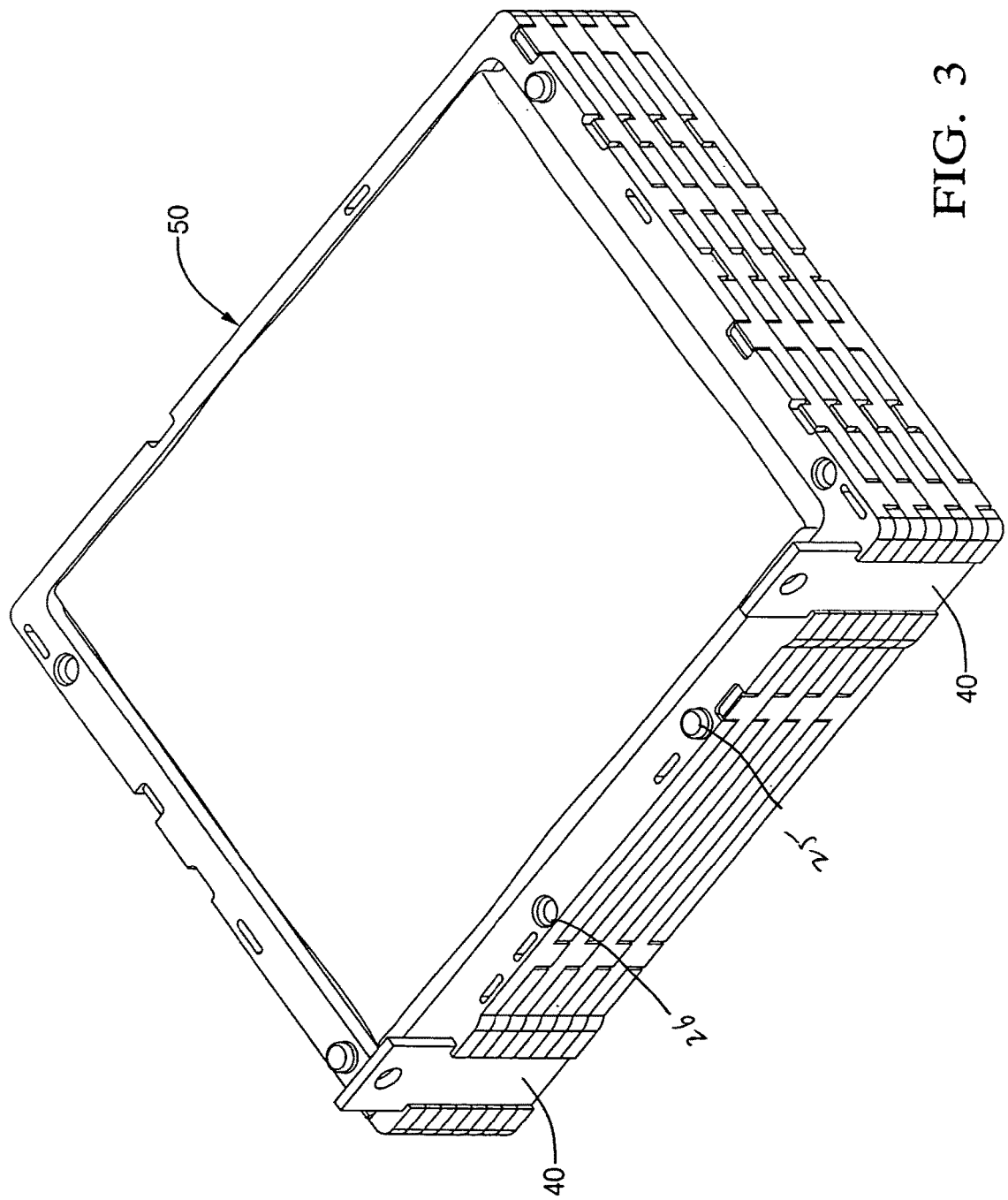
FIG. 3 illustrates a multiple lithium battery cell pack stack with anode and cathode buss bars, forming a lithium battery cell group.

Referring now to FIG. 3, a multiplicity of lithium battery cell pack and frame assemblies are shown stacked together to make lithium battery cell group 50. The frame structure facilitates this grouping by incorporating pin 25 and socket 26 features on the sides of the frame members opposite clamping surfaces 33. Pin 25 and socket 26 secure adjacent framed cells to one another. The number of lithium battery cell packs in the group 50 depends on the desired electrical properties of the group.

FIG. 3 further shows the terminal buss bars 40, one for anodes and one for cathodes, located in the buss bar capture features 22, 32 shown in FIG. 2. In the preferred embodiment, the terminals 11, 12 of a first lithium battery cell pack and frame assembly are folded over into the terminal troughs 26, 36 and then the desired length of buss bars are inserted in the first lithium battery cell pack and frame assembly. The terminals 11 and 12 are then preferably ultrasonically welded to respective buss bars 40. Subsequently, the terminals of a second lithium battery cell pack and frame assembly are folded over into the troughs 26, 36 and then the second lithium battery cell pack and frame assembly is placed on the first lithium battery cell pack and frame assembly in such a manner as to align the buss bars 40 with the buss bar capture feature of the second lithium battery cell pack and frame assembly and align pins 25 and sockets 26 of the first assembly with the corresponding sockets 26 and pins 25 of the second assembly. Of course, the geometry shown for the pin and socket feature is not meant to be limiting as numerous other mating shapes could be utilized to accomplish the same function. The cylindrical shapes shown are merely for illustrative purposes. As noted above, the terminals 11, 12 of the second assembly are then welded, such as ultrasonically welded, to respective buss bars 40. This process continues until the desired number of lithium battery cell pack and frame assemblies are stacked together to make lithium battery cell group 50.

While lithium cell frames according to the invention surrounding the cells provides protection to cell group 50 during handling, once packaged inside the battery pack, additional compressive force beyond that provided by the snap features 25 and 26 or other interlocking features may not supply enough compressive force to grip the cells for certain intended applications. Relative movement between the frames and the cells can result in fractured terminals as they generally consist of delicate foil gauge metals.

Thus, additional compressive clamping force may be required to clamp down on the lithium cells. A sufficient clamping force ensures little or no relative movement between the frames and the cells.

The invention provides arrangements which provide additional compressive force to the cells comprising the cell group. In one embodiment, cell group 50 can be subsequently installed in an external protective case which can be sized to hold the group in such a way as to securely hold all of the lithium battery cell pack and frame assemblies in place, providing additional clamping force on the frame members, further securing the lithium battery cell packs. Alternatively, cell group 50 can be securely held by suitable internal structures.

Figure 4:
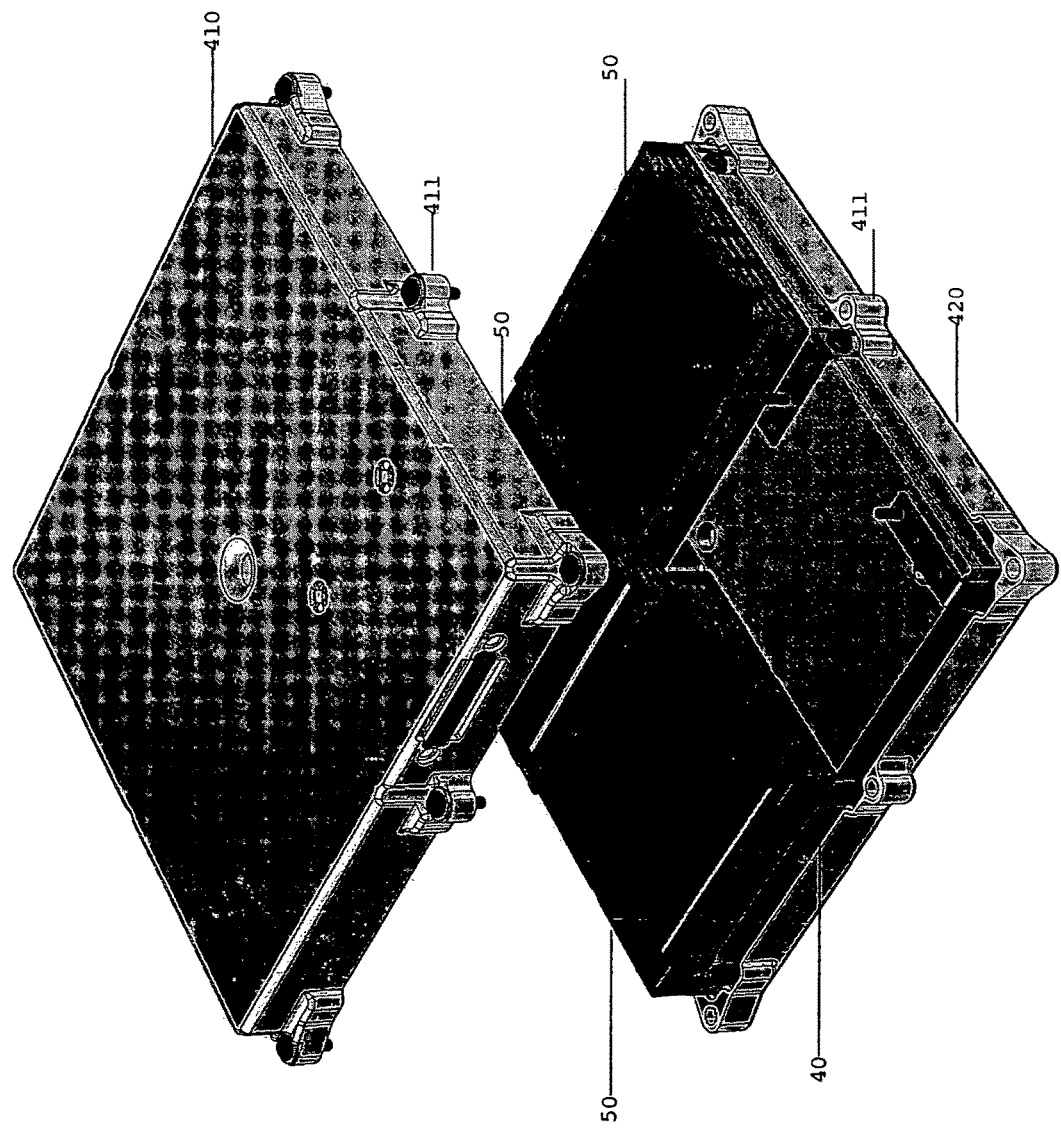
FIGS. 4(a) and (b) show an exploded view of an external compressive force providing structure where the enclosure halves are separated and the enclosure halves after being fastened together using bolts, respectively.
Figure 4B:
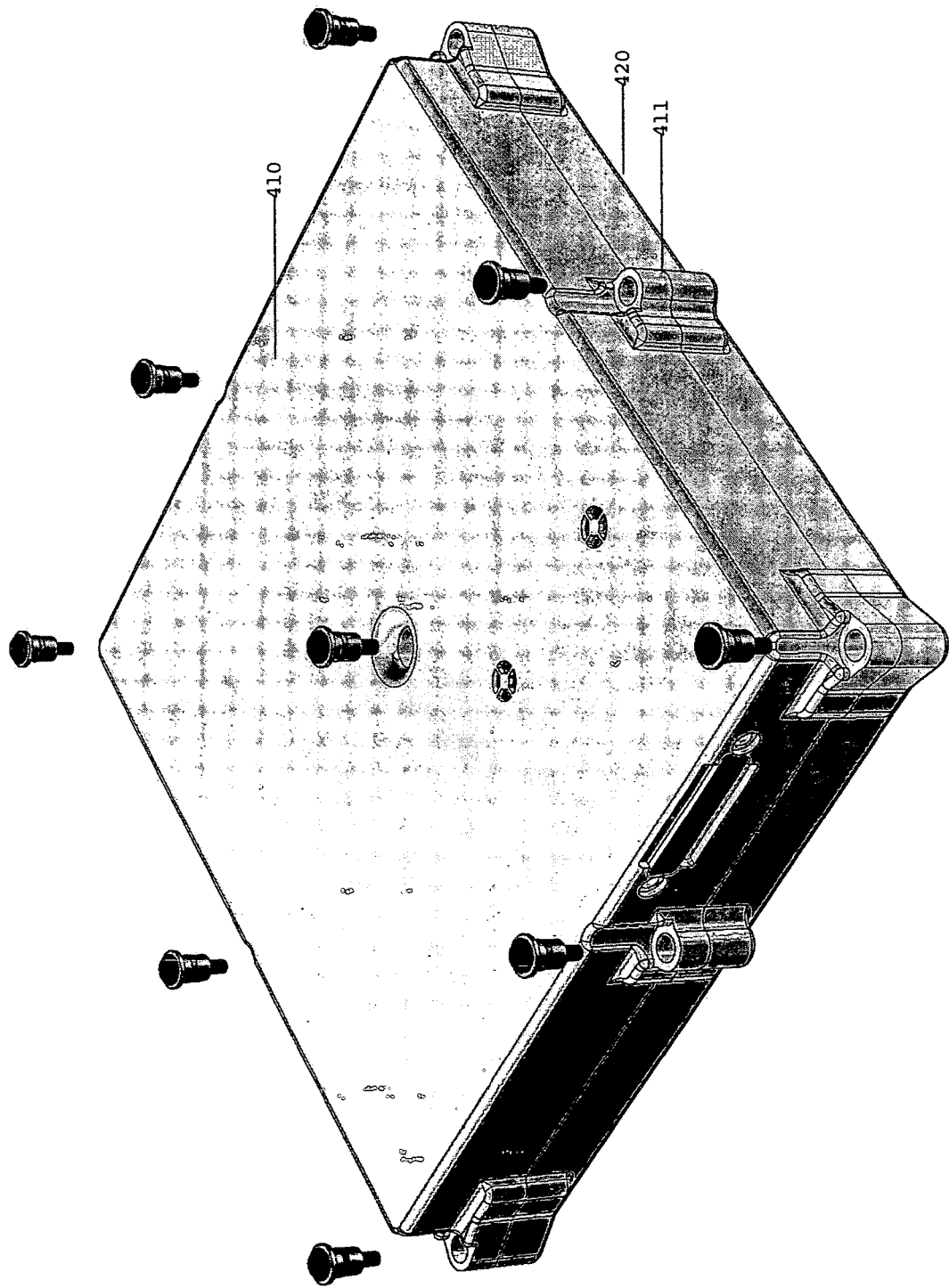

FIGS. 4(a) and (b) show an exploded view of an external compressive force providing structure where the enclosure halves 410 and 420 are separated, while FIG. 4(b) shows the enclosure halves 410 and 420 fastened together using bolts, respectively. A typical material used in battery pack enclosures is a plastic. If additional strength is needed, additives to the plastic can be applied to obtain the needed physical characteristics. If the additives do not provide sufficient strength and stiffness to the enclosure, hybrid metal and plastic components can be manufactured to add additional strength.

The (3) cell groups 50 are shown disposed on enclosure half 420 in FIG. 4(a). The buss bars are preferably attached to the center bussing structure as seen in FIG. 4(a) before the lid is closed and the compressive force is applied to the cell stacks. The bolted features 411 together with bolts 412 of the battery enclosure supply the desired force which minimizes or eliminates relative movement between the frames and the cells comprising cell group 50. Although bolts 412 are shown in FIGS. 4(a) and (b), other fasteners may be used.

The battery pack enclosure shown in FIG. 4(a) contains 7 cell stacks connected in series. The remaining empty quadrant shown can be used to package battery pack accessory hardware, such as protection electronics, fuse(s), connector (s), and an internal wiring harness. The battery pack enclosure can also contain features to form fit around the cell stacks, and preferably also includes the same socket and pin features that will interface with the outside cells.

Figure 5:
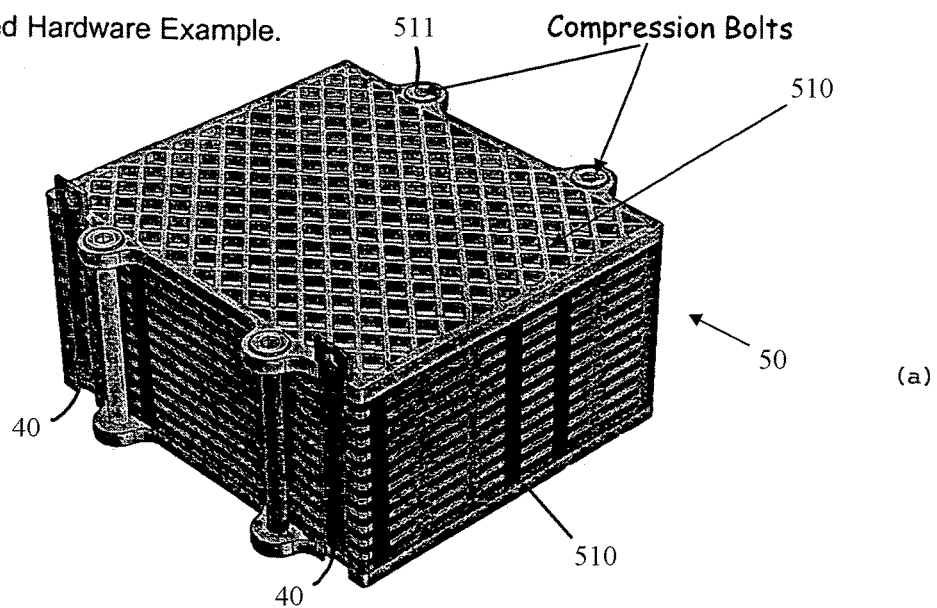
Figure 5:
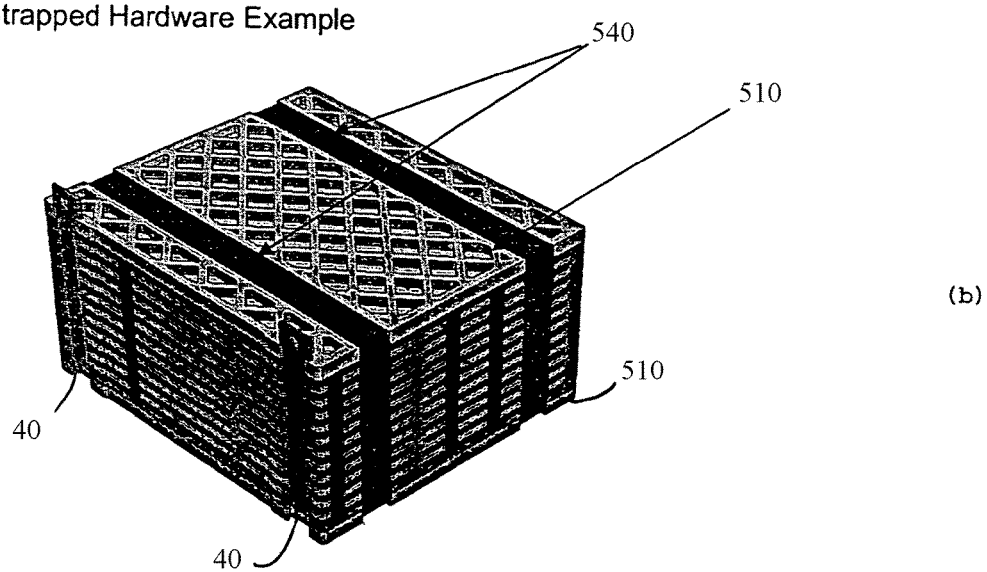
Figure 6B:
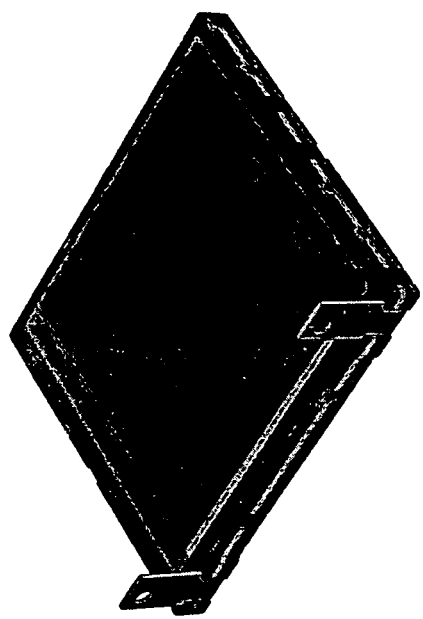
FIG. 6(a)-(d) shows steps in an exemplary framed cell module assembly according to the invention.
Figure 6D:
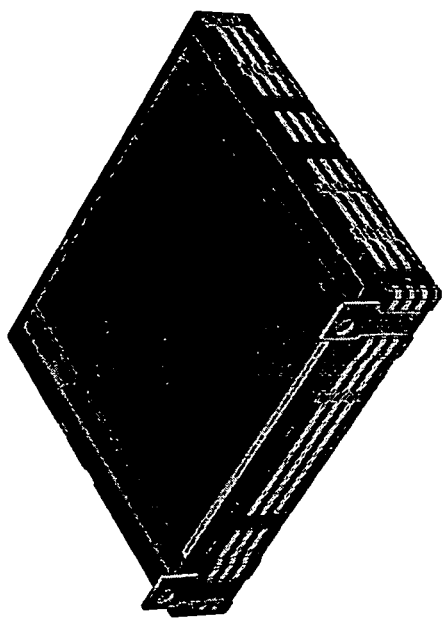
Figure 6:
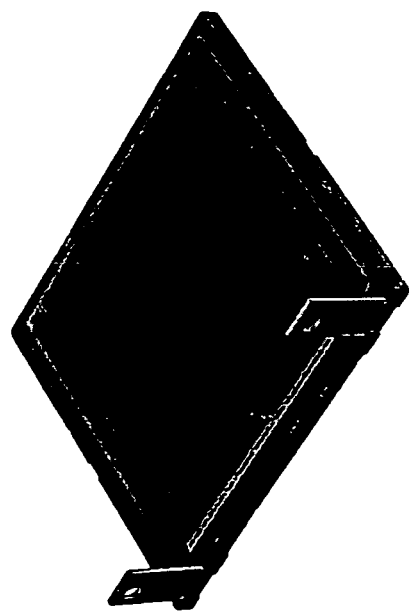
Figure 6C:
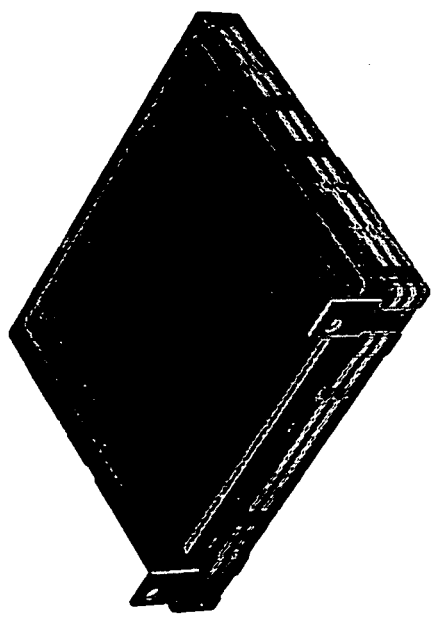

Cell groups 50 can also be configured to include compression system hardware as part of the battery internal sub-assembly. In an alternative force providing structure shown in FIGS. 5(a) and (b), an internal structure is used to supply the compressive force. This can be accomplished using a variety of structures. FIG. 5(a) shows an internal compression system which utilizes compression plates 510 and compression bolts (not shown) which fit in bolted features 511 which minimize or eliminate relative movement between the frames and the cells comprising cell group 50. FIG. 5(b) shows an internal compression system which utilizes compression plates 510 in combination with compression straps 540. Although two (2) straps 540 are shown in FIG. 5(b), a single strap or more than two (20 straps can be used.

The above-described FIGS. 4(a), (b) and 5(a) and (b) are only examples some preferred compressive force supplying structures. Those having ordinary skill in the art will appreciate numerous variations of this inventive arrangement are possible.

FIG. 6(a)-(d) shows steps in an exemplary framed cell module assembly according to the invention having four (4) cells to form a 4 V module. In step (a), a first cell/frame assembly is placed over a buss bar. The weld tabs of the cell are preferably ultrasonically welded to the buss. In steps (b)-(d) successive cell/frame assemblies are placed over the buss bar, then each ultrasonically welded to the buss to form the 4 V framed module.

FIG. 7(a)-(d) shows steps in an exemplary assembly process showing insertion of a plurality of framed cells according to the invention into an external protective case. In FIG. 7(a), a first cell frame stack is inserted into the bottom half of the external frame. FIG. 7(b) shows four stacks inserted into the bottom half of the external frame. FIG. 7(c) shows the resulting structure after placement of a center buss plate on the four stacks shown in FIG. 7(b), and after an additional three stacks placed on the buss bar. FIG. 7(d) shows the resulting battery assembly after attaching all bussing bolts and the final bus bar. The assembly shown in FIG. 7(d) is the same as that shown inserted into the bottom frame half shown in FIG. 4(a).

While the particular METHOD AND APPARATUS FOR SECURING BATTERY CELLS as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A frame assembly for a lithium battery cell group of a plurality of prismatic lithium cell packs, each cell pack having a cathode and an anode, comprising:
   a plurality of cell pack assemblies including
   a first cell pack assembly including:
      a first frame member including a first connector integral with the first frame member, and
      a second frame member including a second connector integral with the second frame member and extending therefrom, the first connector configured to engage the second connector and automatically secure first lithium cell pack with a fixed clamping force;
   a second cell pack assembly including:
      a third frame member including a third connector integral with the third frame member, and
      a fourth frame member including a fourth connector integral with the fourth frame member and extending therefrom, the third connector configured to engage the fourth connector and automatically secure a second lithium cell pack with a fixed clamping force,
   the first cell pack assembly including a fifth connector integral with the first cell pack assembly and extending therefrom, the fifth connector configured to engage a sixth connector of the second cell pack assembly and automatically secure the first and second cell pack assemblies,
   a compression system connecting the plurality of cell pack assemblies together to form the battery cell group, the compression system including at least two compression plates sandwiching the plurality of cell pack assemblies, wherein at least one of the first and second frame members includes a buss bar recess shaped to receive both a buss bar and the portion of the anode or cathode, the buss bar electrically connected to the portion of the anode or cathode when the buss bar is positioned within the buss bar recess.

2. The frame assembly according to claim 1, wherein the compression system further includes at least one strap wrapped around the at least two compression plates.

3. The frame assembly according to claim 1, wherein the compression system further includes at least one bolt fastening the at least two compression plates together.

4. The frame assembly according to claim 1, wherein the first connector includes a tang receiver and the second connector includes a snap tang.

5. The frame assembly according to claim 1, wherein the first and second frame members are formed from a polymeric material having intumescent and fire retardant properties.

6. The frame assembly according to claim 1, wherein the fifth connector includes a pin and the sixth connector includes a socket.

7. The frame assembly according to claim 1, wherein the first and second frame members further include opposing clamp surfaces, and the buss bar extends normal to the clamp surfaces.

8. The frame assembly according to claim 1, wherein the first and second frame members further include opposing clamp surfaces and opposing terminal recesses in the clamp surfaces, the terminal recesses positioned to receive a portion of a cathode or anode.

* * * * *